March 8, 1932. L. E. LA BRIE 1,848,256
BRAKE OPERATING MECHANISM
Filed Oct. 18, 1928
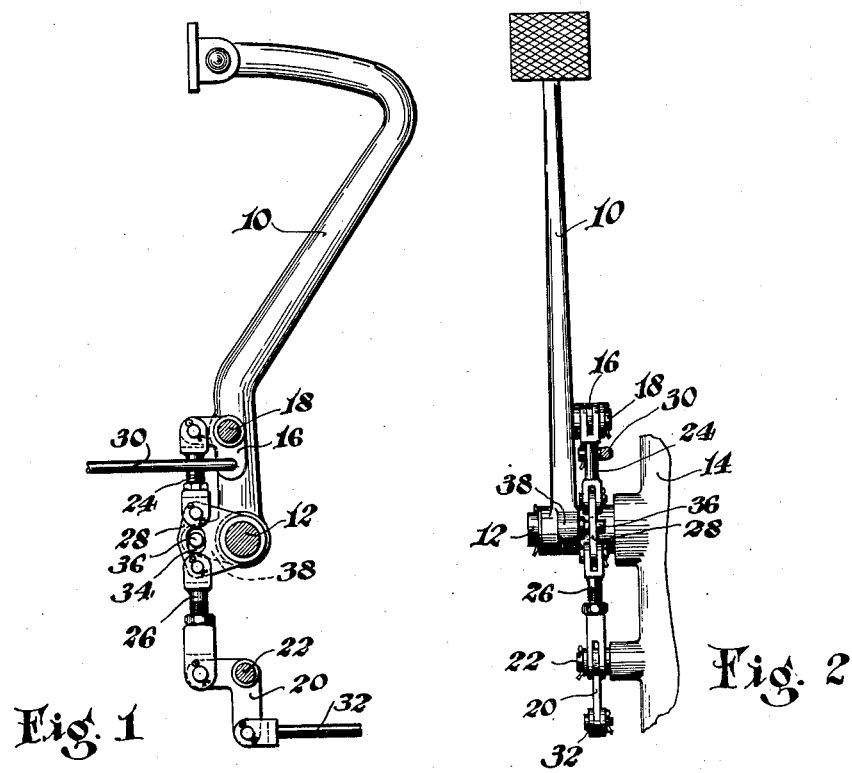
INVENTOR.
Ludger E. LaBrie
BY
ATTORNEY Patented Mar. 8, 1932

1,848,256

UNITED STATES PATENT OFFICE

LUDGER E. LA BRIE, OF SOUTH BEND, INDIANA, ASSIGNOR TO BENDIX BRAKE COMPANY, OF SOUTH BEND INDIANA, A CORPORATION OF ILLINOIS

BRAKE-OPERATING MECHANISM

Application filed October 18, 1928. Serial No. 313,194.

This invention relates to operating mechanism for brakes or the like, and is illustrated as embodied in novel operating mechanism for a system of four-wheel automobile brakes. An object of the invention is to provide a simple system of operating connections for transmitting equalized pressure to the brakes, and preferably also to provide safety means for operating at least part of the brakes even if the equalizing means is rendered inoperative by a failure in the operating connections.

In one desirable arrangement an operating lever, such as the usual service brake pedal, is provided with two bellcrank levers connected respectively to the front and rear brakes or their equivalents, one of the bellcrank levers being mounted on the pedal and the other being independently mounted. A connection between the bellcrank levers gives the desired equalization. Preferably the pedal has a lost-motion engagement with this connection, so that it operates at least one set of brakes even if the equalized mechanism becomes inoperative because of the failure of some part.

The above and other objects and features of the invention, including various novel and desirable details of construction, will be apparent from the following description of one illustrative embodiment shown in the accompanying drawings, in which:

Figure 1 is a side elevation of the pedal and associated parts; and

Figure 2 is a rear elevation of the same parts, looking from the left in Figure 1.

In the arrangement illustrated, the operating lever is the service brake pedal 10 mounted or fulcrumed on a fixed pivot or fulcrum 12, carried if desired by the clutch housing 14, or other suitable support. A bellcrank lever 16 is mounted on a pivot 18 carried by lever 10 above its fulcrum, and another bellcrank lever 20 is mounted on a fixed pivot 22 carried by support 14, the two bellcrank levers having parallel horizontal arms connected by means such as a pair of adjustable links 24 and 26 connected by a generally-triangular idler 28 loosely pivoted on pivot 12. A force-transmitting member 30 leads rearwardly from the vertical arm of the bellcrank lever 16 to the rear brakes or their equivalent, while a force-transmitting member 32 extends from bellcrank lever 20 in the opposite direction to the front brakes or their equivalent.

Preferably the idler has a vertical slot 34 receiving a pin 36 on the end of a short horizontal arm 38 extending from the lower or pivoted end of the pedal. Thus if either of the members 30 or 32 gives way, pin 36 and slot 34 form a lost-motion connection through which the pedal picks up the idler 28 to operate the unbroken member.

While one illustrative embodiment has been described in detail, it is not my intention to limit the scope of the invention to that particular embodiment, or otherwise than by the terms of the appended claims.

I claim:

1. Operating connections comprising, in combination, an operating lever, a pair of bellcrank levers having parallel arms and one of which is mounted on the operating lever and the other of which is independently mounted, a connection between said parallel arms such that movement of the operating lever imparts an operative movement to both bellcrank levers, and force-transmitting members operated by the unconnected arms of the bellcrank levers.

2. Operating connections comprising, in combination, an operating lever, a pair of bellcrank levers having parallel arms and one of which is mounted on the operating lever and the other of which is independently mounted, a connection between said parallel arms such that movement of the operating lever imparts an operative movement to both bellcrank levers, force-transmitting members operated by the unconnected arms of the bellcrank levers, and a direct lost-motion connection between the operating lever and said first connection.

3. Operating connections comprising, in combination, an operating lever fulcrumed at one end and having a projection at said end extending at right angles to the body of the lever, a bellcrank lever pivoted on the operating lever a short distance above its fulcrum, a second bellcrank lever pivoted independently of the operating lever, force-transmitting members acted on by said bellcrank levers, and a connection between said bell crank levers passing adjacent said projection and having a lost-motion connection therewith.

4. Operating connections comprising, in combination, a fulcrumed operating lever, a bellcrank lever pivoted on the operating lever a short distance above its fulcrum, a second bellcrank lever pivoted independently of the operating lever, force-transmitting members acted on by said bellcrank levers, and a connection between said bell crank levers.

5. Operating connections comprising, in combination, a bellcrank lever pivoted on a fixed support, a bellcrank lever pivoted on a movable support, means connecting parallel arms of said levers so that movement of the movable support imparts an operative movement to the lever on the fixed support and force-transmitting members operated by the unconnected arms of said levers.

6. Operating connections comprising, in combination, a pair of bellcrank levers having parallel arms, a connection between said parallel arms such that bodily movement of one of said levers imparts an operative movement to the remaining lever, force-transmitting members operated by the unconnected arms of the said levers and a lost-motion connection between the means for bodily moving said first mentioned lever and said first mentioned connection.

7. Operating connection comprising, in combination, an operating lever, a lever member pivoted on the operating lever a short distance above its fulcrum, a second lever pivoted independently of the operating lever, force-transmitting members acted on by said second and third mentioned levers, together with a connection between said last mentioned levers, cooperating with means on said first mentioned lever to insure operation of said second and third mentioned levers despite the breakage of one or the other of the same.

In testimony whereof I have hereunto signed my name.

LUDGER E. LA BRIE.